United States Patent
Achatz et al.

(10) Patent No.: US 12,386,062 B2
(45) Date of Patent: Aug. 12, 2025

(54) RADAR SYSTEM AND METHOD FOR TRANSMITTING DATA IN A RADAR SYSTEM

(71) Applicant: Infineon Technologies AG, Neubiberg (DE)

(72) Inventors: Simon Achatz, Munich (DE); Maximilian Eschbaumer, Munich (DE)

(73) Assignee: Infineon Technologies AG, Neubiberg (DE)

(*) Notice: Subject to any disclaimer, the term of this patent is extended or adjusted under 35 U.S.C. 154(b) by 509 days.

(21) Appl. No.: 17/730,229

(22) Filed: Apr. 27, 2022

(65) Prior Publication Data

US 2023/0350056 A1    Nov. 2, 2023

(51) Int. Cl.
*G01S 13/931* (2020.01)
*G01S 7/41* (2006.01)

(52) U.S. Cl.
CPC .......... *G01S 13/931* (2013.01); *G01S 7/411* (2013.01); *G01S 7/415* (2013.01); *G01S 7/417* (2013.01); *G01S 2013/93185* (2020.01)

(58) Field of Classification Search
CPC ........ G01S 13/931; G01S 7/411; G01S 7/415; G01S 7/417; G01S 2013/93185
See application file for complete search history.

(56) References Cited

U.S. PATENT DOCUMENTS

| | | | | |
|---|---|---|---|---|
| 11,885,903 B2* | 1/2024 | Meissner | ............... | G01S 7/023 |
| 2015/0346321 A1* | 12/2015 | Jansen | ............... | H03M 7/30 |
| | | | | 342/107 |
| 2018/0356497 A1* | 12/2018 | Roger | ............... | G01S 7/2806 |
| 2019/0041494 A1* | 2/2019 | Roger | ............... | G01S 7/003 |
| 2019/0180148 A1* | 6/2019 | Jiang | ............... | G06N 3/045 |
| 2019/0353753 A1* | 11/2019 | Gebhardt | ............... | G01S 13/931 |
| 2020/0150220 A1* | 5/2020 | Maor | ............... | G01S 7/038 |
| 2021/0018593 A1* | 1/2021 | Kästner | ............... | G01S 13/931 |
| 2021/0208236 A1* | 7/2021 | Wilson et al. | ......... | G07C 5/008 |
| 2022/0026568 A1* | 1/2022 | Meuter | ............... | G01S 7/41 |

* cited by examiner

*Primary Examiner* — Marcus E Windrich
(74) *Attorney, Agent, or Firm* — Viering, Jentschura & Partner mbB

(57) ABSTRACT

According to various embodiments, a radar system is described including a first radar processing device and a second radar processing device, wherein the first radar processing device is configured to generate radar data and to transmit the radar data partially to the second radar processing device for further processing, wherein the first radar processing device is configured to omit parts of the radar data from the transmission and wherein the second radar processing device is configured to reconstruct the omitted parts using a machine learning model trained to supplement radar data with additional radar data and is configured to further process the transmitted parts of the radar data in combination with the additional radar data.

19 Claims, 14 Drawing Sheets

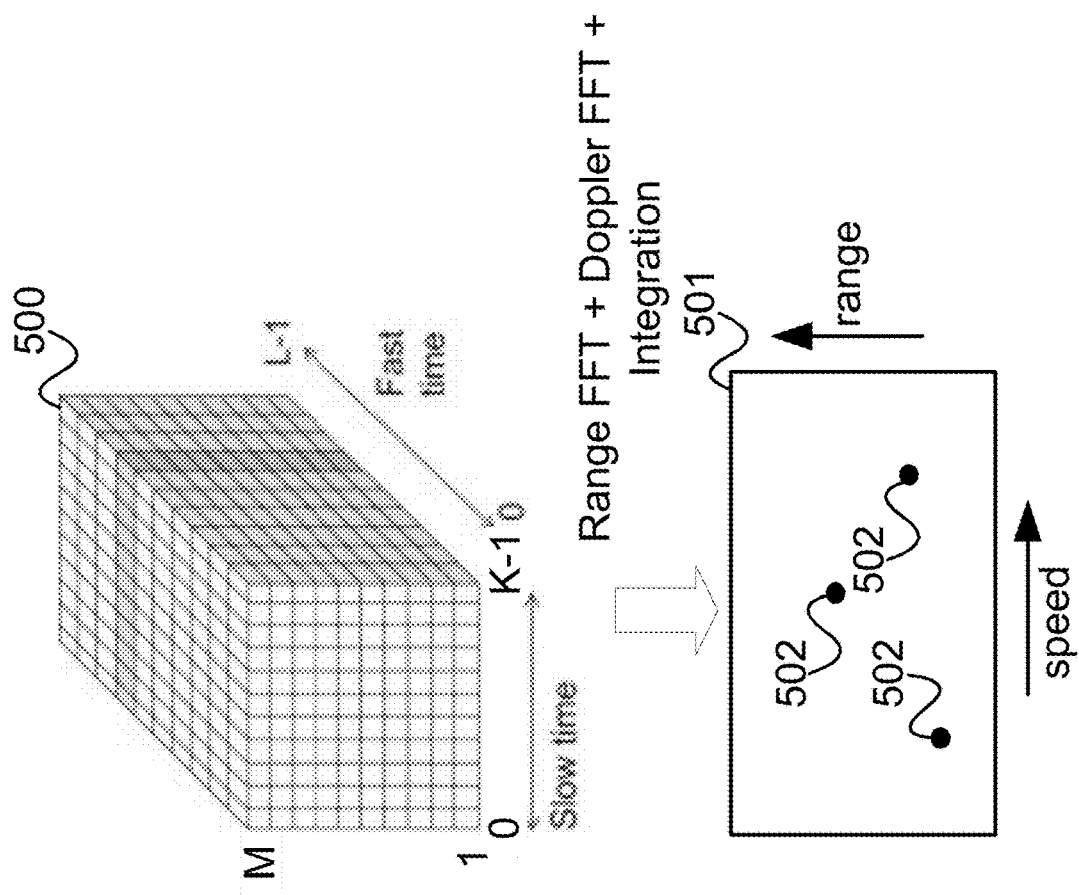
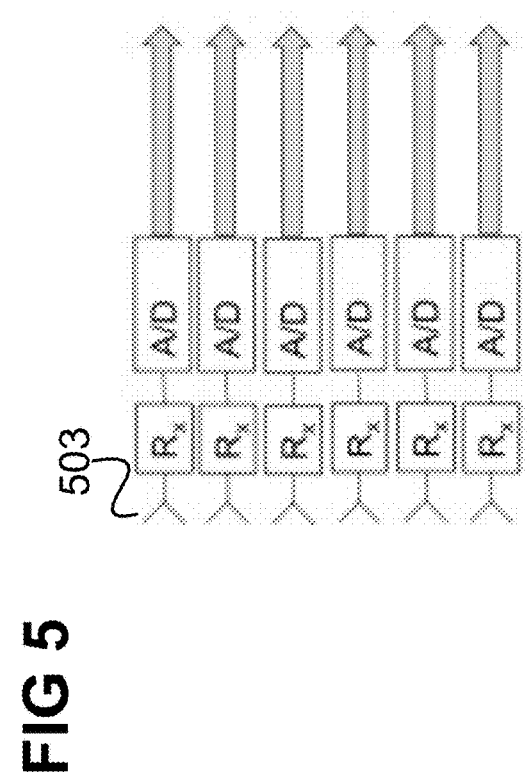
FIG 5

FIG 12 a) Extrapolation of Uniform Arrays (→ increased resolution)
1201 b) Extrapolation of Sparse Arrays (→ increased resolution)
1202 c) Interpolation of Sparse Arrays (→ increased dynamic range)
1203 d) Combination of b) and c)
1204

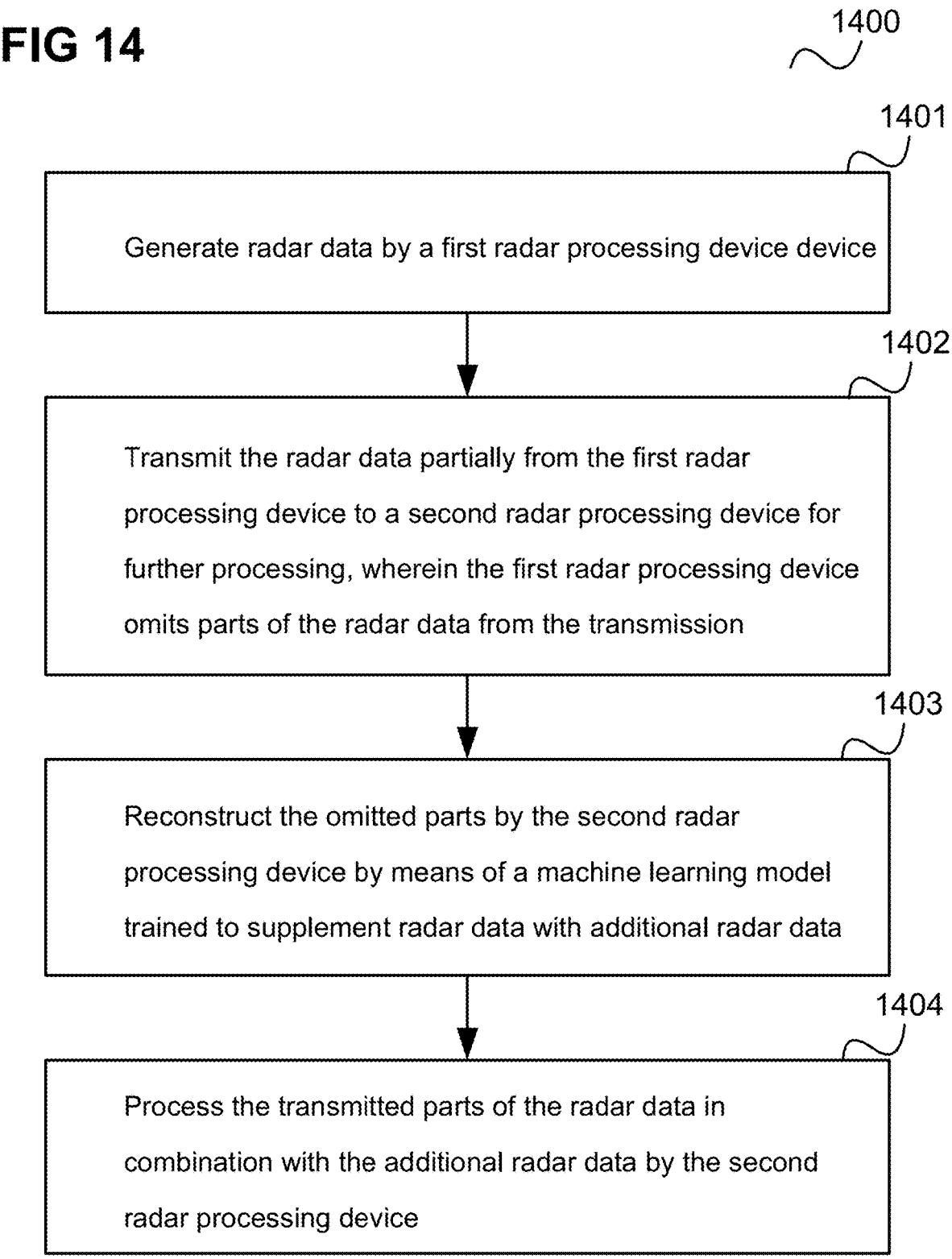

RADAR SYSTEM AND METHOD FOR TRANSMITTING DATA IN A RADAR SYSTEM

TECHNICAL FIELD

Exemplary implementations described herein generally relate to radar systems and methods for transmitting data in a radar system.

BACKGROUND

A radar system which allows accurate estimation of position (including range and direction) and velocity of target objects processes a high amount of radar data. Therefore, in case such a radar system includes multiple devices, i.e. in case of distributed processing, high amounts of data need to be transmitted between the devices. One example is a radar system in a vehicle where a part of the processing is performed by a radar sensor device and further processing is performed by a control device separate from the radar sensor device, e.g. a control device such as a microcontroller of an Advanced Driver Assistance System. Since transmission of the radar data puts a high load on the interfaces (transmission lines etc.) between the devices and thus may require provision of extra high bandwidth connections, approaches are desirable that allow efficient transmission of data between radar processing devices within a radar system.

SUMMARY

According to various embodiments, a radar system is provided including a first radar processing device and a second radar processing device, wherein the first radar processing device is configured to generate radar data and to transmit the radar data partially to the second radar processing device for further processing, wherein the first radar processing device is configured to omit parts of the radar data from the transmission and wherein the second radar processing device is configured to reconstruct the omitted parts using a machine learning model trained to supplement radar data with additional radar data and is configured to further process the transmitted parts of the radar data in combination with the additional radar data.

According to a further embodiment, a method for transmitting data in a radar system according to the above radar system is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 5 shows a data cube.

FIG. 12 illustrates this extrapolation and interpolation for restoration of Doppler FFT coefficients for a virtual receive antenna array with eight antennas.

FIG. 14 shows a flow diagram illustrating a method for transmitting data in a radar system.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
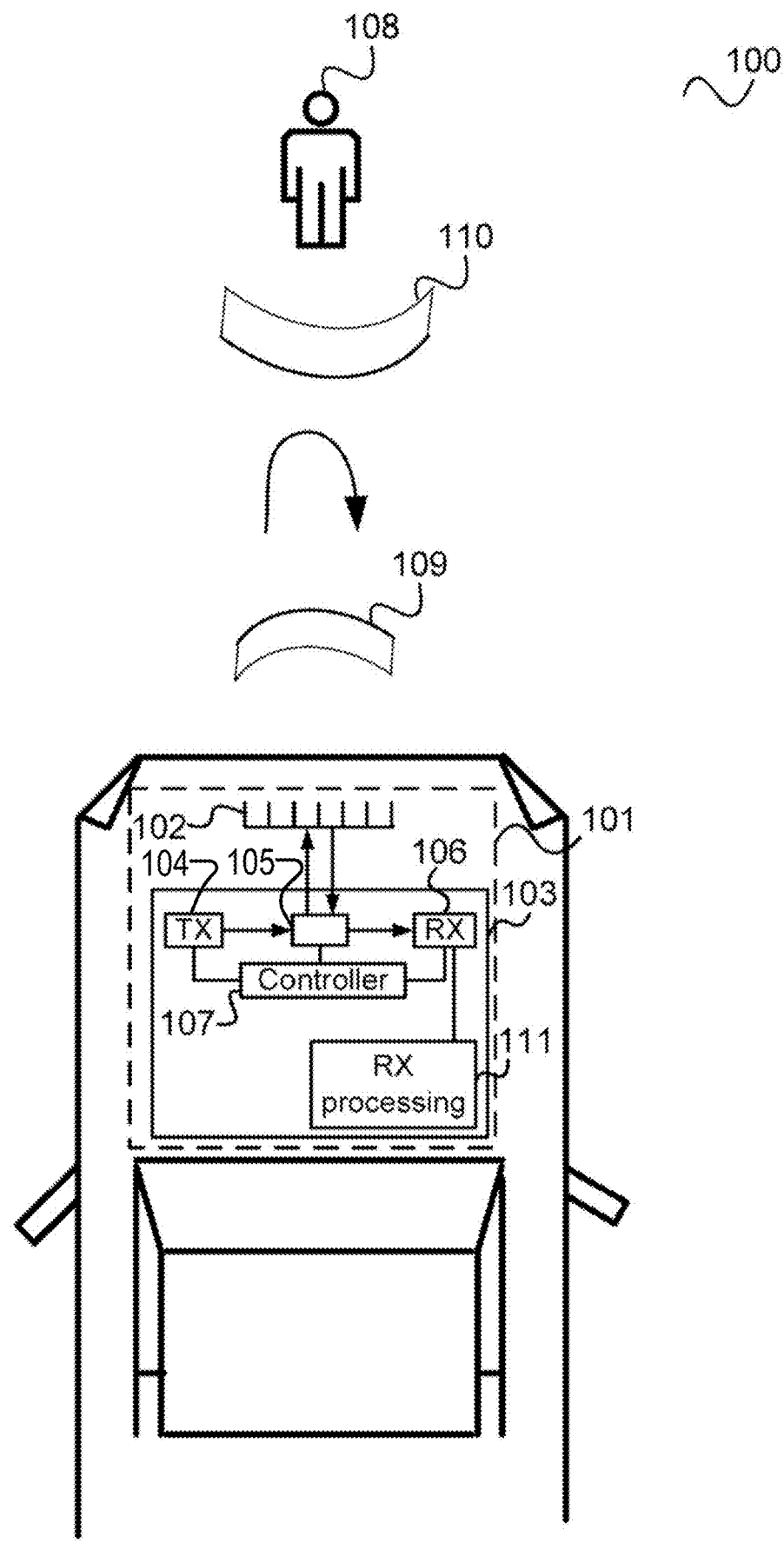
FIG. 1 shows a radar arrangement.

FIG. 1 shows a radar arrangement 100.

The radar arrangement 100 includes a radar device (implementing a radar system) 101 that includes an antenna arrangement 102 and a radar control device 103. It should be noted that, while the radar system is in this example implemented by a radar device 101, the radar system may be also implemented by an arrangement of devices, e.g. including an electronic control unit (ECU) or a vehicle controller and/or a device (or arrangement) implementing an Advanced Driver Assistance Systems (ADAS).

The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:

1. The one or more transmitters 104 transmit a transmit signal 109 via the antenna arrangement 102.
2. The transmit signal 109 is reflected by a target (object) 108;
3. The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

Figure 2:
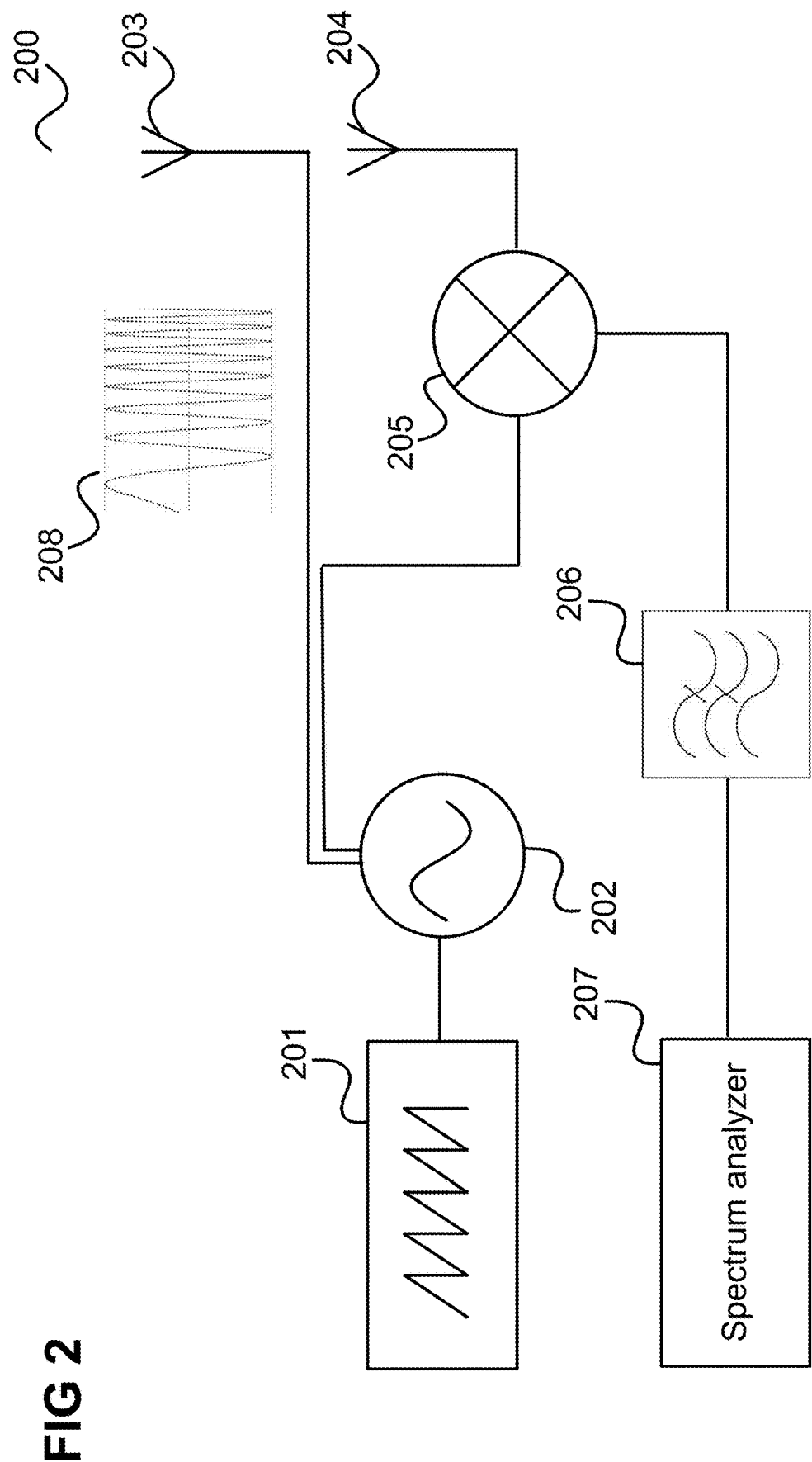
FIG. 2 illustrates an FMCW (Frequency Modulated Continuous Wave) radar system.

FIG. 2 illustrates an FMCW radar system 200.

In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps (or "ramps"), which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110, for example by means of a third stage FFT (also denoted as angular FFT). Accordingly, a radar receiver may include a mixer 205, an analog filter 206 and an ADC for each receive antenna.

The signals received by a plurality of antennas may be processed by means of an MMIC (Monolithic Microwave Integrated Circuit).

Figure 3:
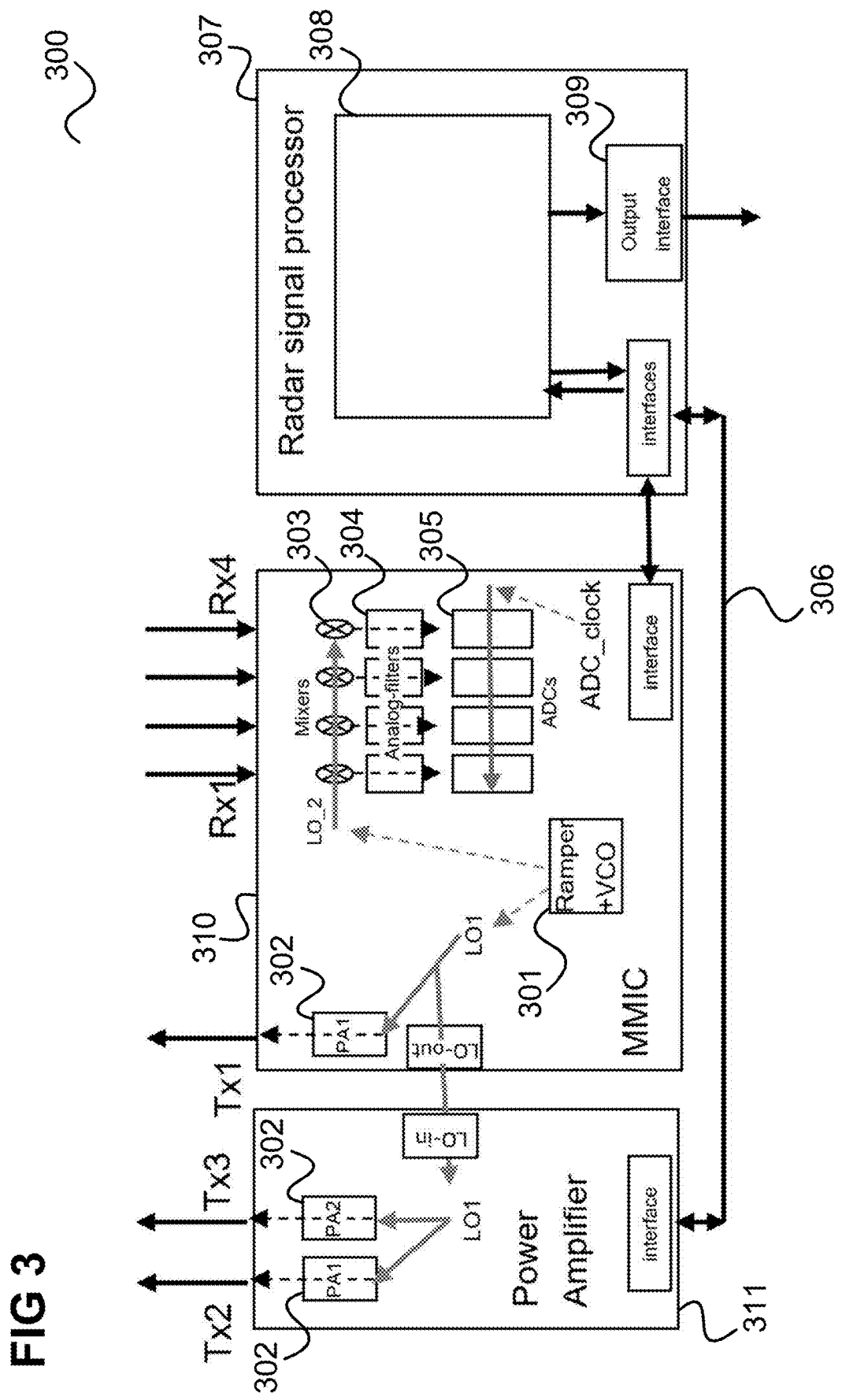
FIG. 3 shows a radar device having a plurality of transmit antennas and receive antennas.

FIG. 3 shows a radar device 300 having a plurality of transmit antennas and receive antennas.

The radar device 300 includes an MMIC 310 which includes a (voltage-controlled) oscillator with ramper 301 which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311 to which the transmit signal is provided via a transmit signal interface 312. However, the transmit amplifiers may also all be provided within the MMIC 310.

There is one mixer 303 in the MMIC 310 for each receive antenna. Analog filters 304 (corresponding to filter 206) filter the mixed signals and analog-to-digital converters (ADCs) 305 generate digital signals from the filtered analog signals. The MMIC 310 transfers their output via a digital interface 306 to a radar signal processor 307.

The radar signal processor 307 has a radar signal processing circuit 308 (for example corresponding to the radar signal processing circuit 111), implements a spectrum analyzer and performs object detection and determination of direction of arrival as explained in the following with reference to FIG. 4.

Figure 4:
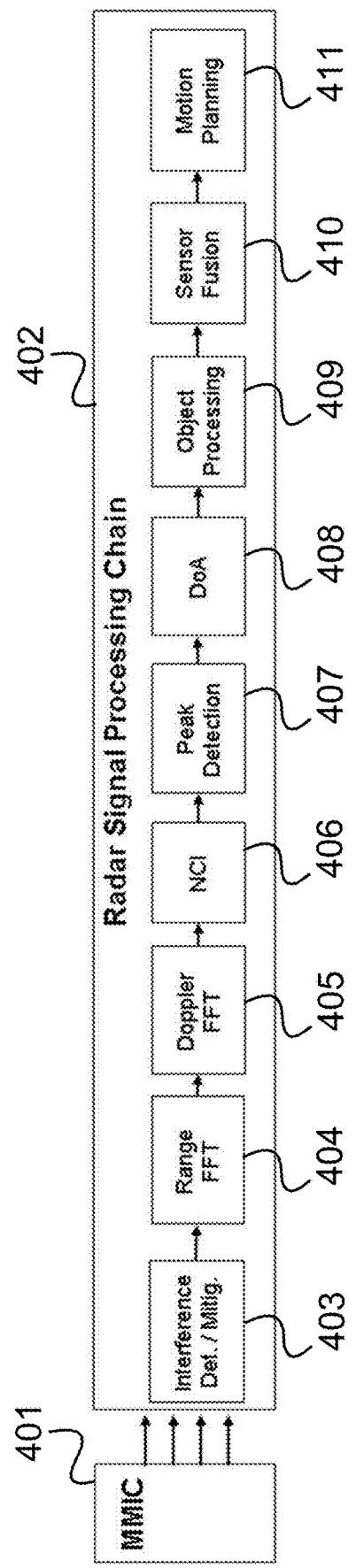
FIG. 4 illustrates the processing of radar signals.

FIG. 4 illustrates the processing of radar signals received using an MMIC 401.

The MMIC 401 is for example part of the receiver 106. The MMIC 401 is coupled with a plurality of antennas and is supplied with received signals from the respective plurality of antennas.

It should be noted that the number of receive signals that an MMIC may process in parallel is limited (and thus an MMIC can only serve a limited number of receive antennas), multiple MMICs may be used to allow using a higher number of receive antennas. In that case, there are multiple MMICs instead of the single MMIC 401 but the processing is similar.

The MMIC 401 performs processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. The MMIC 401 supplies the resulting digitized receive signals to a radar signal processing chain 402 (e.g. implemented by radar signal processor 307).

The radar signal processing chain 402 performs interference detection and mitigation 403 on the digitized receive signals followed by a first FFT (Fast Fourier Transform) 404, also referred to as range FFT, and a second FFT 405, also referred to as Doppler FFT. Based on the outputs of the FFTs 404, 405 the radar signal processing chain 402 determines range information as well as velocity information (e.g. in form of a R/D (range-Doppler) map) for one or more objects in 407.

It should be noted that the output of the second FFT 405 is a two-dimensional FFT result (wherein one dimension corresponds to range and the other to velocity) for each antenna (namely based on the processing of the samples of the receive signal received by this specific antenna). The result of the first FFT 404 includes, for each receive antenna, a complex value for a range bin.

The second FFT 405 goes over the result of the first FFT 404 over multiple chirps, for each range bin, generating, per range bin, a complex value for each Doppler bin. Thus, result of the second FFT stage 405 includes, for each receive antenna, a complex value for each combination of Doppler bin and range bin (i.e. for each Doppler/range bin). This can be seen to give an antenna-specific R/D map.

In 406, to generate an aggregate R/D map, the radar processing chain 402 combines the MMIC-specific R/D maps, e.g. by summing them up, for example by coherent or non-coherent integration. In 407, it then estimates the velocity and range of specific objects by identifying peaks in the aggregate R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 408, the radar signal processor 307 may further determine the direction of the one or more objects. This can be done based on the phase differences of the output values of the second stage FFT between different receive antennas and may include a third stage FFT (angular FFT).

Based on the results of this processing, further processing such as object classification, tracking, generation of an object list, e.g. including sensor fusion at some point, and decision-making (e.g. motion planning in autonomous driving) may be performed in 409, 410 and 411. This may at least partially be carried out by a further component such as a vehicle controller. For this, the radar signal processor 307 may output processing results via an output interface 309.

The digitized receive signals provided by the MMIC 401 are typically arranged in a data cube.

FIG. 5 shows a data cube 500.

The data cube 500 includes digitized samples of receive signals from M antennas forming a receive antenna array 503. The MMIC 401 performs analog/digital conversion to generate the digitized samples.

For example, for each chirp, the received signal is sampled to have L samples (e.g. L=512).

The L samples collected for each chirp are processed by the first FFT 404.

The first FFT 404 is performed for each chirp and each antenna, so that the result of the processing of the data cube 500 by the first FFT 404 has again three dimensions and may have the size of the data cube 500 but does no longer have values for L sampling times but instead values for L/2 range bins (because usually the second half of the range bins is omitted because it is a repetition of the first half due to the FFT being applied to real input values).

The result of the processing of the data cube 500 by the first FFT 404 is then processed by the second FFT 405 along the chirps (for each antenna and for each range bin).

The direction of the first FFT 404 is referred to as fast time whereas the direction of the second FFT 405 is referred as slow time.

The result of the second FFT 405 gives, when aggregated over the antennas (in 406), a range-Doppler (R/D) map 501 which has FFT peaks 502 (i.e. peaks of FFT output values (in terms of absolute values) for certain range/speed combinations (i.e. for certain range-Doppler bins) which the radar signal processor 307 expects to correspond to detected objects 108 (of a certain range and speed).

The various stages of the radar signal processing (including the generation of the samples) may be carried out on different (radar processing) devices. For example, in the illustration of FIG. 3, the generation of the samples is carried out by the MMIC 401 and the further processing is carried out by the radar signal processor 306. However, the separation may be different or there may be further separations. For example, the following cases may arise:

Case 1) The generation of the samples is performed on a first (radar processing) device and the Range FFT 404 is performed on a second (radar processing) device. This case is illustrated by FIG. 3. Interference determination and mitigation may also be performed on either device.

Case 2) The range FFT 404 is performed by a first device (which may or may not perform the sampling) and the Doppler FFT 405 is performed by second device Case 3) The Doppler FFT 405 is performed by a first device and the processing of the Doppler FFT results (DoA determination 408) is performed by a second device. NCI 406 and Peak Detection 407 may be performed on either device but in any case, Doppler FFT results need to be transmitted between the devices. Depending on where the NCI 406 takes place, the Doppler FFT results may be channel-specific or aggregated. Both are referred to as Doppler FFT results (or Doppler FFT coefficients) herein.

According to these cases, the samples, the range FFT coefficients or the Doppler FFT coefficients, respectively, need to be transmitted from the first device to the second device. Since the amount of these data may be quite high, the bandwidth required by the devices is quite high which may not be easy to be provided in applications like in vehicle radar system and may require installing additional data lines.

Therefore, according to various embodiments, a mechanism is provided to reduce the amount of data that needs to be transferred between the two devices. This is achieved by discarding some of the data at the first device and reconstructing the discarded data at the second device using a machine learning model.

Figure 6:
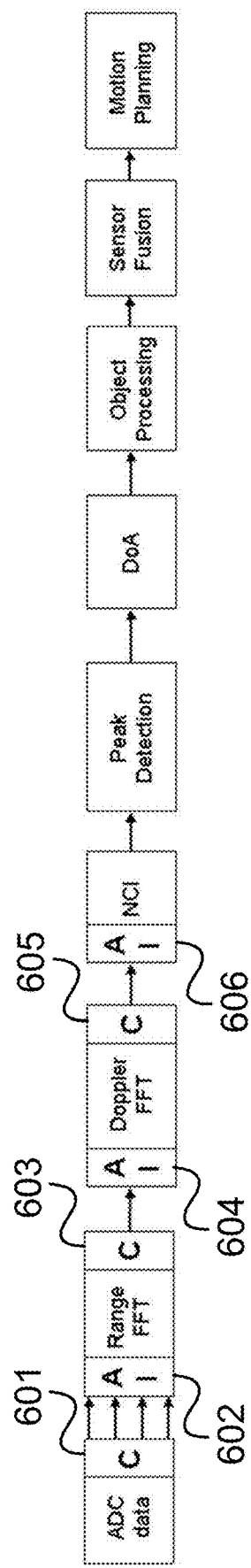
FIG. 6 shows the inclusion of compressing (C) and decompressing (reconstructing by AI) at various states in the processing of FIG. 4.

FIG. 6 shows the inclusion of compressing (C) and decompressing (reconstructing by AI) at various states in the processing of FIG. 4.

According to the case 1) above, data compression (discarding of samples 601) may be performed after sampling and decompressing (reconstruction of samples 602) may be performed before the range FFT.

According to the case 2) above, data compression (discarding of range FFT coefficients 603) may be performed after range FFT and decompressing (reconstruction of range FFT coefficients 604) may be performed before the Doppler FFT.

According to the case 3) above, data compression (discarding of Doppler FFT coefficients 605) may be performed after Doppler FFT and decompressing (reconstruction of Doppler FFT coefficients 606) may be performed before NCI (or compression after NCI or peak detection and decompressing before DoA determination).

Between each pair of discarding 601, 603, 605 and the subsequent decompressing (reconstructing or restoring) 602, 604, 606, a transmission between separate devices, e.g. over a bus in a vehicle, an Ethernet, a wireless connection etc. may take place, depending on the case of samples, range FFT coefficients and Doppler coefficients (with an amount of data reduced by compression in each case). Depending on how the processing is distributed over two or more separate device, one or more of the pairs of discarding and subsequent decompressing may be implemented in a radar system.

The first device may for example be a radar sensor device and the second device may for example be a control device, such as a device (e.g. microcontroller) of an ADAS.

In each of the three cases, in the discarding 601, 603, 605 parts of radar reception result data, also denoted as radar data in short, are discarded. For the three cases 1), 2), 3) these radar data are Case 1) Samples
Case 2) Range FFT coefficients
Case 3) Doppler FFT coefficients.

Figure 7:
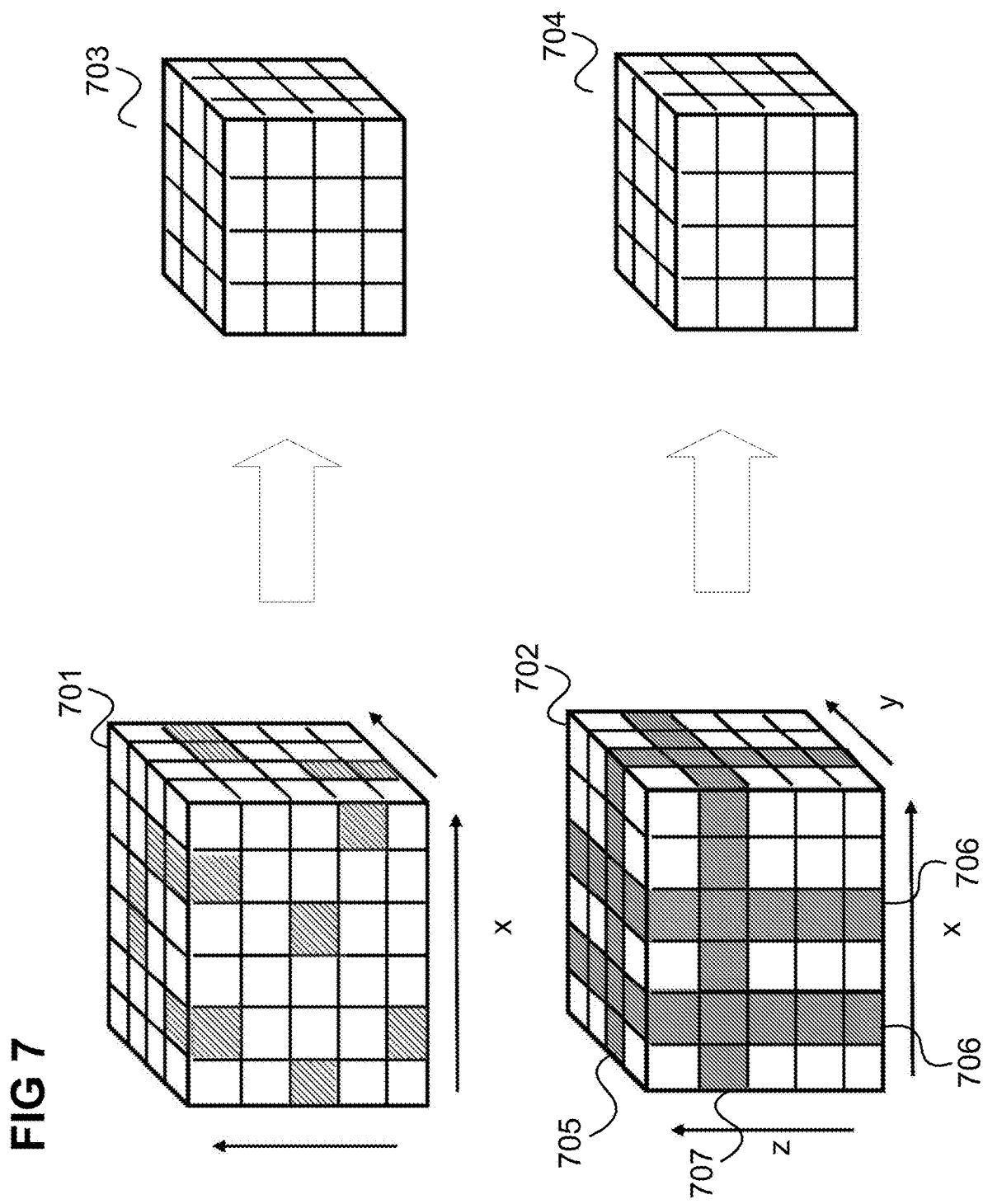
FIG. 7 illustrates the discarding of radar data.

FIG. 7 illustrates the discarding of radar data.

The radar data is represented as a cube (of radar data) 701, 702.

For case 1), this is the data cube 500 also shown in FIG. 5 which holds samples. In case 2) it holds range FFT coefficients and in case 3) it holds Doppler FFT coefficients. Accordingly, the three axes correspond to the following Case 1) x-axis: slow time, y-axis: fast time, z-axis: antenna index Case 2) x-axis: slow time, y-axis: range bins, z-axis: antenna index Case 3) x-axis: Doppler bins, y-axis: range bins, z-axis: antenna index When discarding, sparsity is added in one or more dimensions at fixed or random positions.

For a first cube of radar data 701, a random discarding is illustrated. This means that at random positions within the cube of radar data 701, the corresponding sample/range FFT coefficient/Doppler FFT coefficient is discarded. It should be noted that the positions may be randomly (or pseudo-randomly) chosen but may then be fixed such that the second device knows the positions without having to be told by the first device. Alternatively, the first device may adaptively choose the positions (or a portion of preset positions) and inform the second device about the positions where radar data elements (i.e. samples/range FFT coefficients/Doppler FFT coefficients) were discarded. The result of the discarding is a smaller cube of radar data 703 which can be stored with lower memory requirements and which may be transmitted with lower bandwidth requirements.

The discarding may for example be performed in line with a bit map or mask which indicates the positions of the cube of radar data which should be discarded. The bit mask may for example be two dimensional and be applied for each layer of the radar data cube in one direction. For example, it may be a bit mask for the x-y-plane and be applied for each antenna, e.g., for case 3), a R/D map bit mask for discarding Doppler FFT coefficients. This bit mask may be set by the first device and transferred to the second device such that the second device knows which radar data elements have been discarded. By setting the number of ones and zeroes in the bit mask, the first device can set the compression rate.

For a second cube of radar data 702, a discarding is illustrated where whole layers of the cube of radar data are discarded.

A discarded layer may be a whole x-z-layer 705 which is
In case 1) The samples for a certain sampling time for all antennas and all chirps
In case 2) The range FFT coefficients for a certain range bin for all antennas and all chirps
In case 3) The Doppler coefficients for a certain range bin for all antennas and all Doppler bins A discarded layer may be a whole y-z-layer 706 which is
In case 1) The samples for a certain chirp for all sampling times and all antennas
In case 2) The range FFT coefficients for a certain chirp for all range bins and all antennas
In case 3) The Doppler coefficients for a certain Doppler bin for all range bins and all antennas.

A discarded layer may be a whole x-y-layer 707 which is
In case 1) The samples for a certain antenna for all sampling times and all chirps
In case 2) The range FFT coefficients for a certain antenna for all range bins and all chirps
In case 3) The Doppler coefficients for a certain antenna for all range bins and all Doppler bins (i.e. a R/D map for a certain antenna).

Again, the result is a smaller cube of radar data 704. Further, as described above, the first device may choose the compression rate by setting the number of layers to be discarded.

It should be noted that there are no limitations regarding the number of antennas, sampling times and chirps, e.g. one or more MMICs and a radar processor (e.g. microcontroller) may be provided to handle any number of antennas, sampling times and chirps according to various embodiments.

It should further be noted that while the description above referred to antennas, this may also be channels, in particular in case of a MIMO (multiple-input, multiple-output) radar system, wherein each channel is formed by a pairs of one of multiple transmit antennas and one of multiple receive antennas. These channels (each formed by a combination of transmit and receive antenna) are also referred to as virtual channels.

In the respective reconstruction of radar data elements, the discarded radar data need to be restored by the second device, i.e. the second device needs to reconstruct the full cube of data 701, 702 from the (respective) small cube of data 703, 704 it has received from the first device.

In the following, techniques for reconstructing the data in the above three cases, i.e. for reconstructing samples, for reconstructing range FFT coefficients and for reconstructing Doppler coefficients are described. These are using machine learning models and the respective decompressing 602, 604, 606 is therefore referred to as AI decompressing using a respective machine learning model.

For case 1), i.e. restoration of samples, a machine learning model is used to compute samples which were discarded. In this example, it is for simplicity of explanation assumed that samples for individual sampling times (but not all sampling times) were discarded such that they can be reconstructed by interpolation and/or extrapolation over sampling times. These sampling times of the discarded samples are in the following referred to as additional sampling times (with respect to the sampling times for which samples have not been discarded). In case that samples for all sampling times were discarded (for specific chirps and/or channels), the samples may be analogously reconstructed via interpolation and/or extrapolation over channels or chirps (rather than sampling times).

So, in this example, before performing range FFT, the second device processes input samples for the range FFT for certain sampling times (with which it was provided by the first device) using a machine learning model (e.g. a neural network) which generates samples for additional sampling times by interpolation and/or extrapolation.

Figure 8:
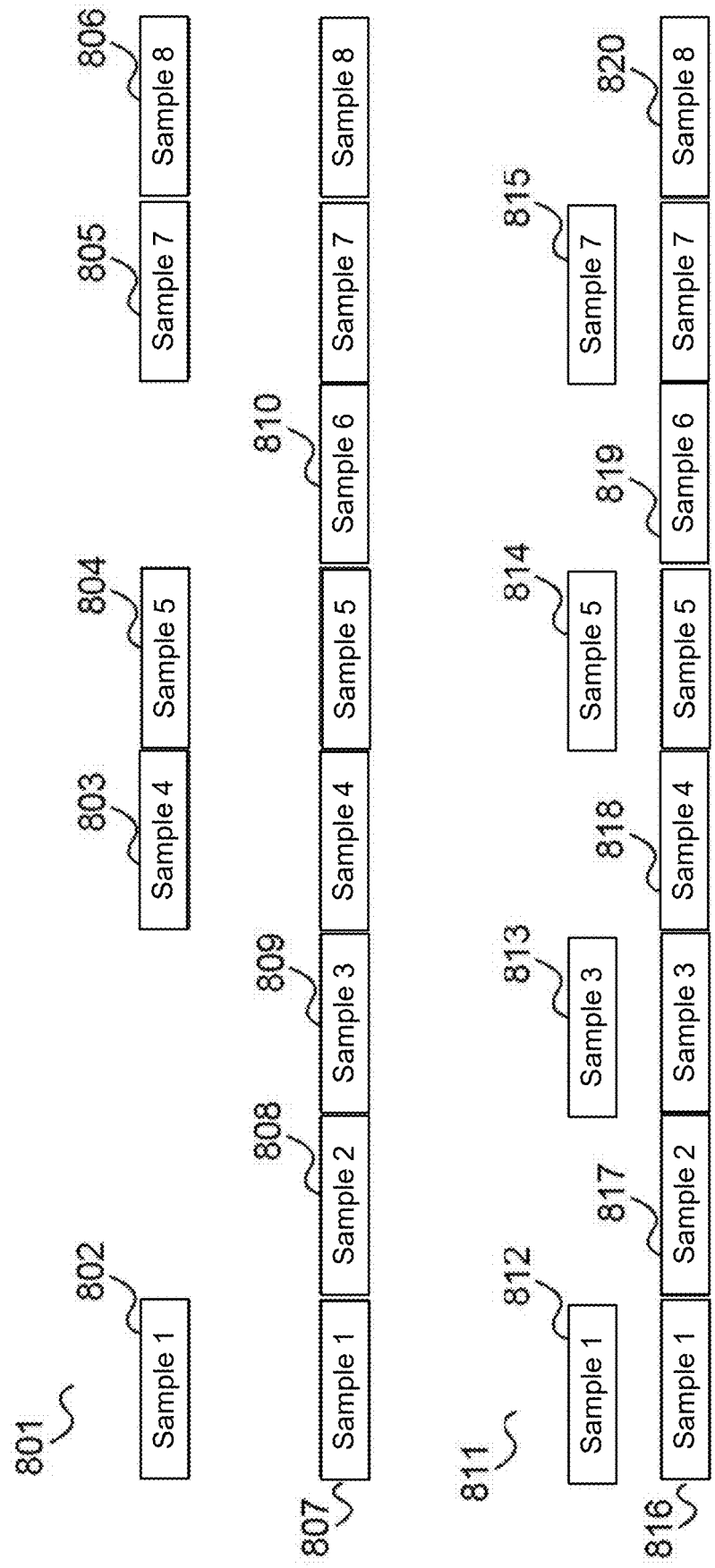
FIG. 8 illustrates this interpolation and extrapolation for restoration of samples.

FIG. 8 illustrates this interpolation and extrapolation for restoration of samples.

In an example illustrated by a first diagram 801, it is assumed that the AI decompressing 602 is only provided with a sample 802, 803, 804, 805, 806 for sampling times #1, #4, #5, #7 and #8 of a uniform sequence of chirps (#1 to #8).

The machine learning model fills up the samples by interpolation to "full" range FFT input data 807 for the range FFT 704, i.e. generates samples 808, 809, 810 for sampling times #2, #3, and #6. This may be seen as a restoration of samples (generally as calculation of missing samples).

In an example illustrated by a second diagram 811, it is assumed that the first device provides samples for sampling times corresponding to a sampling frequency $f_0$ and the AI decompressing 602 calculates additional samples such that there are samples for sampling times according to a higher sampling frequency, e.g. $f_s=2*f_0$. So, in this example, the AI decompressing 602 is only provided with four samples 812, 813, 814, 815.

The machine learning model fills up these data by interpolation and extrapolation to samples for each of sampling times #1 to #8, i.e. "full" range FFT input data 816 by generating samples 817, 818, 819, 820. For the input of the AI decompressing 602, the received sequence of samples may for example be zeroed (by the signal processing unit performing the AI decompressing 602 such as a microcontroller) such that there are gaps for the samples which the AI decompressing 602 should insert into the sequence of samples.

It should be noted that the AI decompressing 602 may also extrapolate to sampling times, i.e. for sampling times earlier or later than those for which it was provided with samples.

Training data for the machine learning model (e.g. neural network) may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data (depending on at what stage the A/D conversion happens in the processing) to generate corresponding range FFT input. A second option is to simulate range FFT input directly for a scene.

For example, training data is generated by simulation runs with following parameters drawn from a random, uniform distribution:

Number of targets $x_0=[1 \ldots n]$
Range of targets $x_1=[1 \text{ m}, 300 \text{ m}]$
RCS (radar cross section) of the targets $x_2=[-5 \text{ dbsm}, 20 \text{ dbsm}]$
SNR of targets $x_3=[5 \text{ dB}, 20 \text{ dB}]$ The neural network may process a vector of samples for a certain chirp (i.e. generate samples for each chirp individually.

In the input to the neural network, a vector of complex values, e.g. $[c_0, c_1, c_2, c_3]$ in case of four sampling times ($C_i$ is the sample for sampling time i), may be reordered into a real-valued vector, e.g. $[r_0, r_1, r_2, r_3, i_0, i_1, i_2, i_3]$ to keep the relationship between real and imaginary part (wherein $r_i$ contains the real value of the sample $c_i$ and $i_i$ the imaginary values). Complex samples may occur when IQ sampling is used.

The neural network may for example be (or include) an autoencoder or an MLP (multi-layer perceptron) or a recurrent neural network (RNN), e.g. with LSTM (long short-term memory).

The number of nodes of the input layer is equal to the number of components of the input vector (times two if complex values are concatenated). The input vector includes the vector of samples. The input vector may have placeholders for the sampling times for which the neural network is supposed to generate samples (so, for example eight components for the example of FIG. 8 since the range FFT input data is supposed to be completely filled for all eight sampling times).

The hidden layers of the neural network may be fully-connected layers with varying size and any activation function, e.g. ReLU.

The output layer is a regression layer with a number of nodes equal to the number of components of the output vector (times two if complex values are split into two real values). Similar as for the input vector, the output vector may have components for all sampling times or only components for the sampling for which the AI decompressing 602 should generate samples (i.e. not for those for which it is provided with samples).

Figure 9:
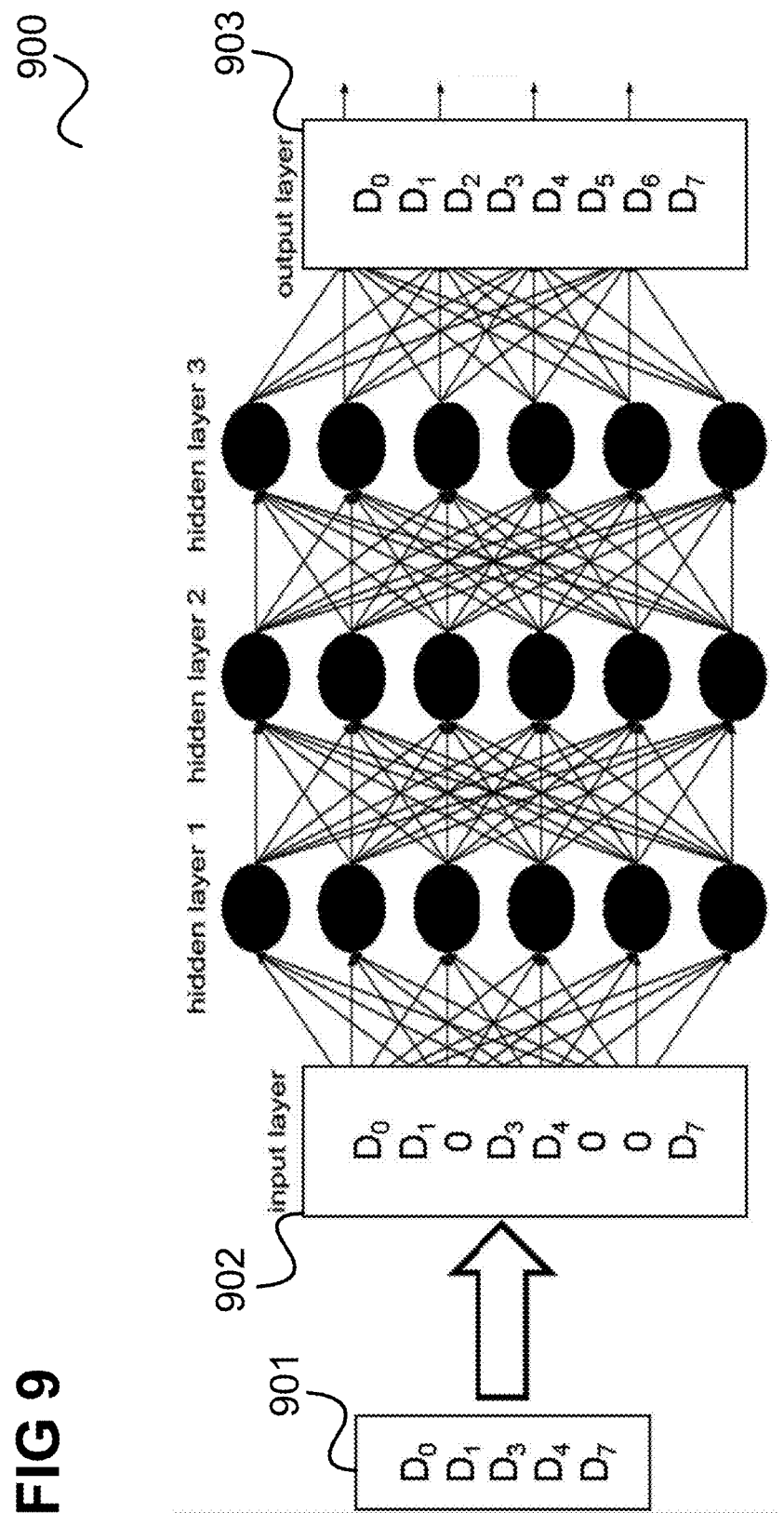
FIG. 9 shows an example of a neural network having an MLP structure.

FIG. 9 shows an example of a neural network 900 having an MLP structure.

For training the neural network 900, data D is simulated or recorded for a full sequence of sampling times (eight sampling times in this example like in the examples of FIG. 8). Di is the sample for sampling time i. Then, the extrapolation or interpolation factor is set and the data for some sampling times (#2, #5, #6 in the example shown) is set to zero (i.e. samples for these sampling times are zeroed).

The neural network 900 is then trained with
Input: data with zeroed samples and random channel errors
Ground truth output: original data (i.e. full vector of simulated samples with or without channel errors so the neural network 900 may in addition be trained for error correction).

The neural network is thus trained to learn the relationship between zeroed samples and original samples.

For inference, in this example, the AI decompressing 602 input are samples 901 for five sampling times (i.e. a vector including a sample for each of five sampling times). In this example, the received data is zero-padded to an input vector 902 for the neural network 900 (but the neural network may also be configured to receive only the samples 901 as input vector without zero padding).

The neural network is applied (run) on the input vector 902 to produce an output vector 903 (with samples for eight sampling times, i.e. +60% increase in elements). The output vector 903 is then supplied to the range FFT.

It should be noted that in inference, the neural network (since it outputs the samples for the whole sequence of sampling times) may modify (update) the existing samples (i.e. those for sampling times for which the AI decompressing 602 is provided with (non-zeroed) samples).

Alternatively, the neural network 900 may only provide data for the missing sampling times (i.e. for which is not provided with samples). The network size can then be smaller (because of fewer input nodes and output nodes) but the existing data (for the sampling times for which the AI decompressing 602 was provided with samples) are not updated (which may or may not be desirable depending on the use case).

Figure 10:
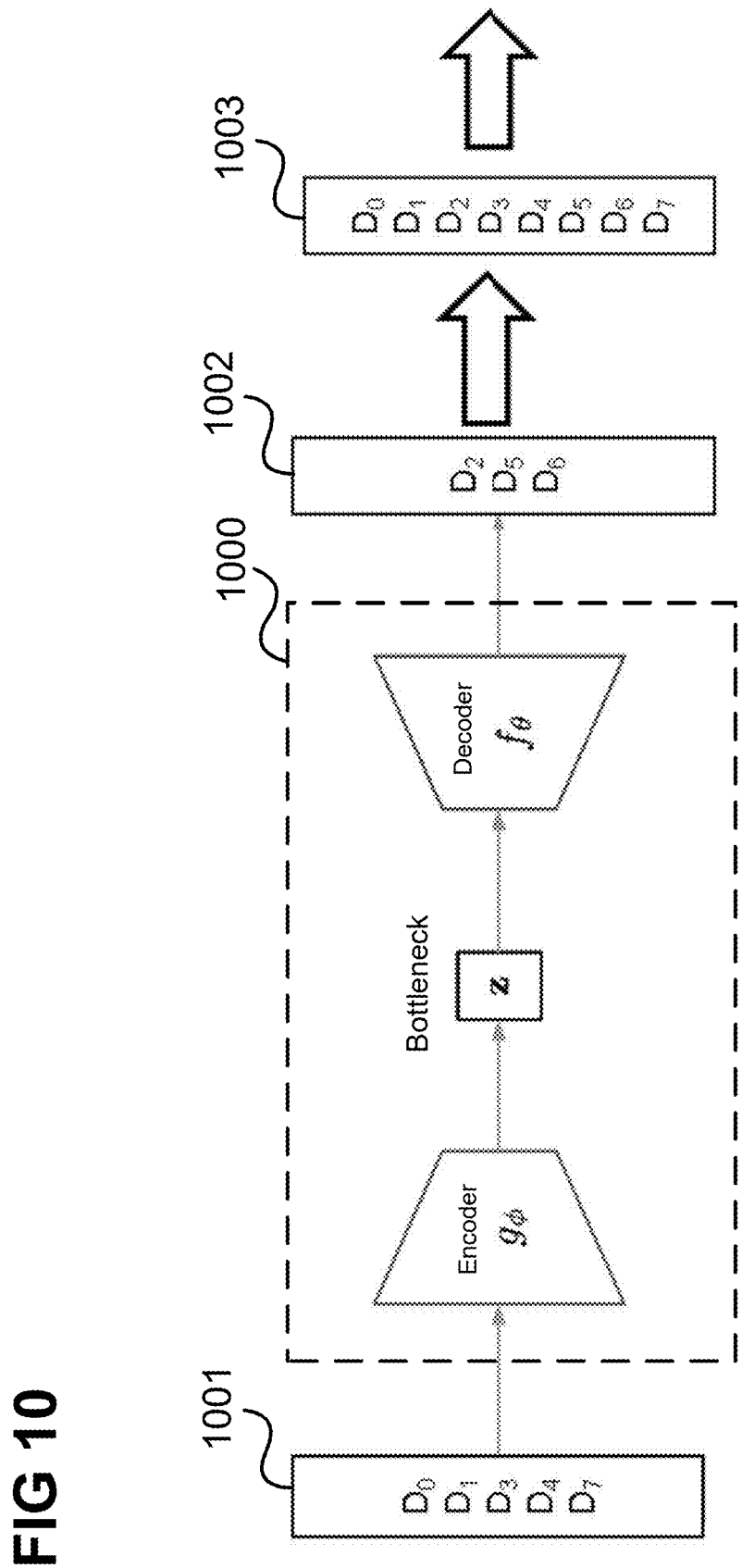
FIG. 10 shows an example of a neural network having an autoencoder structure.

FIG. 10 shows an example of a neural network 1000 having an autoencoder structure.

For training, data D is simulated or recorded using a full sequence of sampling times (eight sampling times in this example). Then, the extrapolation or interpolation factor is set and the data for some sampling times (#2, #5, #6 in the example shown) is removed. The neural network 1000 is then trained with
Input: data for selected sampling times (i.e. without those which have been removed)
Ground truth output: removed data.
The neural network is thus trained to learn the relationship between selected and removed data.

For inference, in this example, the AI decompressing input is data 1001 for five sampling times (i.e. a vector including a sample for each of five sampling times). This input data 1001 is also the input vector for the neural network 1000.

The neural network is applied (run) on this input vector 1001 to produce an output vector 1002 having data for additional three sampling times. The output vector 1002 is put together with the input vector 1001 to an input vector 1003 for the range FFT for the respective chirp (and channel).

It should be noted that training may be performed by an external device. For example, the machine learning model may be trained by a computer and later be stored in a device implementing the AI decompressing. Nevertheless, the training device may be regarded as part of the radar system, even if it is external.

For case 2), i.e. restoration of range FFT coefficients, a machine learning model is used to compute range FFT coefficients which have been discarded.

In this example, it is for simplicity of explanation assumed that all range FFT coefficients for individual chirps (i.e. range FFT coefficients of that chirp for all channels and range bins) were discarded (but not of all chirps) such that they can be reconstructed by interpolation and/or extrapolation over chirps. These chirps are in the following referred to as additional chirps (with respect to the chirps for which range FFT coefficients have not been discarded). In case that certain range FFT coefficients were discarded for all chirps (for specific range bins and/or channels), the range FFT coefficients may be analogously reconstructed via interpolation and/or extrapolation over channels or range bins (rather than chirps). If not all range FFT coefficients for individual chirps have been discarded (i.e. have not been discarded for all channels and range bins) the range FFT coefficients which have not been discarded do not need to be reconstructed but in the following, a way is described to reconstruct all. If any do not need to be reconstructed, they can be fixed or the machine learning model may be configured to not provide an output for those.

So, in this example, before performing Doppler FFT, the second device processes the range FFT coefficients with which it is provided from the first device using a machine learning model (e.g. a neural network) which generates a processed input which corresponds to an increased number of chirps by extra- and interpolation.

Figure 11:
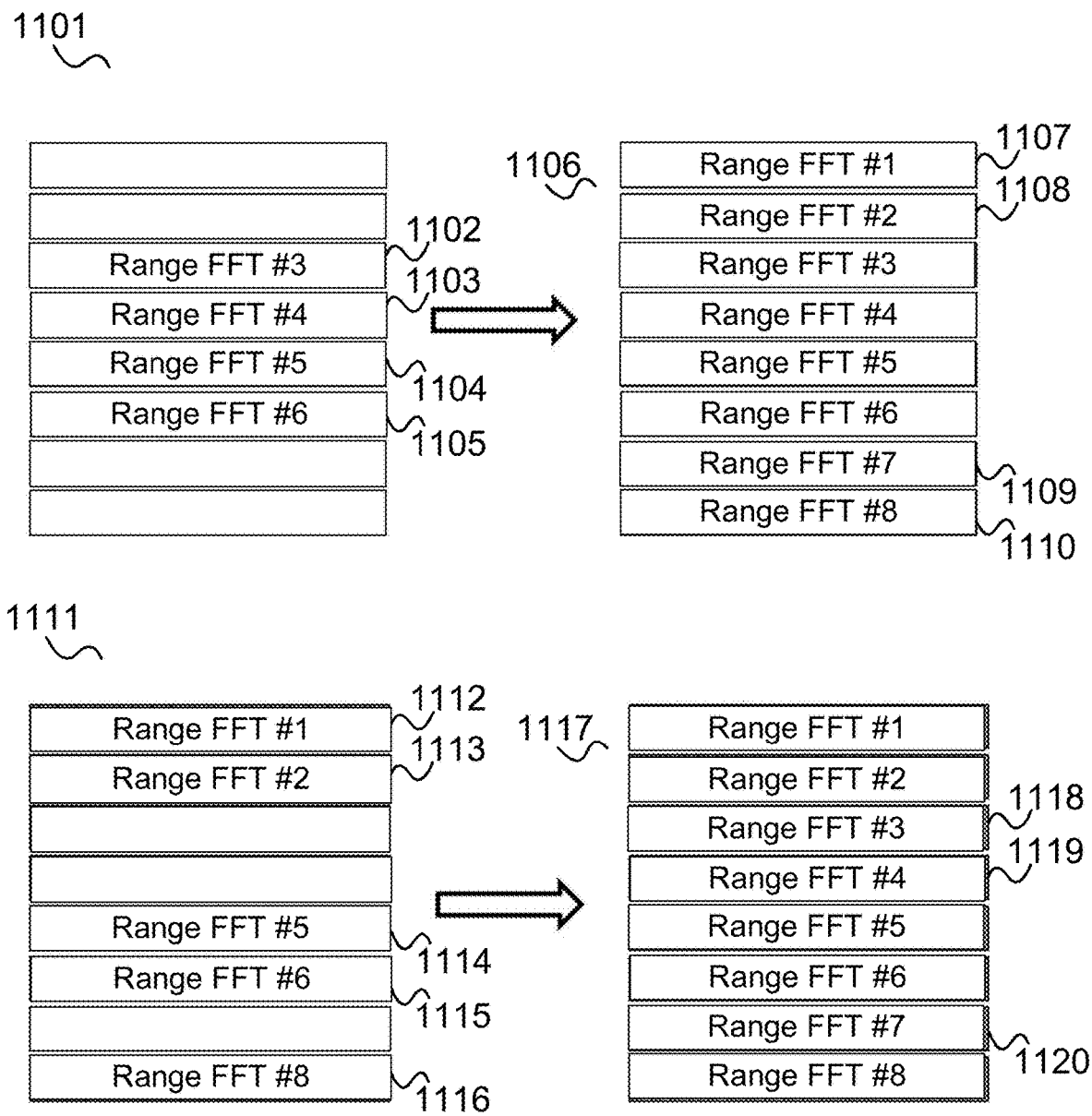
FIG. 11 illustrates this extrapolation and interpolation for restoration of range FFT (Fast Fourier Transform) coefficients.

FIG. 11 illustrates this extrapolation and interpolation for restoration of range FFT coefficients.

In an example illustrated by a first diagram 1101, it is assumed that the second device is only provided with range FFT output including a respective vector 1102, 1103, 1104, 1105 of range FFT coefficients for chirps #3, #4, #5 and #6 of a uniform sequence of chirps (#1 to #8).

The machine learning model fills up this data by extrapolation to "full" Doppler FFT input data 1106 for the Doppler FFT, i.e. generates range FFT coefficient vectors 1107, 1108, 1109, 1110, for chirps #1, #2, #7 and #8.

In an example illustrated by a second diagram 1111, it is assumed that the second device is only provided with range FFT output including a respective vector 1112, 1113, 1114, 1115, 1116 of range FFT coefficients for chirps #1, #2, #5, #6 and #8 of the uniform sequence of chirps.

The machine learning model fills up this data by interpolation to "full" Doppler FFT input data 1117 for the Doppler FFT, i.e. generates range FFT coefficient vectors 1118, 1119, 1120, for chirps #3, #4 and #7.

Training data for the machine learning model (e.g. neural network) may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data to generate corresponding Doppler FFT input. A second option is to simulate Doppler FFT input directly for a scene.

For example, training data is generated by simulation runs with following parameters drawn from a random, uniform distribution:

Number of targets $x_0 = [1 \ldots n]$
Velocity of targets $x_1 = [-50$ m/s, $50$ m/s$]$
RCS (radar cross section) of the targets $x_2 = [-5$ dbsm, $20$ dbsm$]$
SNR of targets $x_3 = [5$ dB, $20$ dB$]$ In the input to the neural network, a complex-valued matrix, e.g. $[C_0, C_1, C_2, C_3]$ in case of four chirps ($C_i$ is the vector of range FFT Fourier coefficients for chirp i), may be reordered into a real-valued vector, e.g. $[R_0, R_1, R_2, R_3, I_0, I_1, I_2, I_3]$ to keep the relationship between real and imaginary part (wherein $R_i$ contains the real values of the components of $C_i$ and $I_i$ the imaginary values).

The neural network may for example be (or include) an autoencoder or an MLP (multi-layer perceptron) or a recurrent neural network (RNN), e.g. with LSTM (long short-term memory)

The number of nodes of the input layer is equal to the number of components of the input matrix times two (complex values concatenated). The input matrix may include, for each chirp (for which the second device receives range FFT coefficients), the vector of range FFT coefficients. The input matrix may have placeholders for the chirps for which the neural network is supposed to generate range FFT coefficients (so, for example eight complex coefficient vectors, i.e. 16 real vectors for the example of FIG. 11 since the input data is supposed to be completely filled for all eight chirps).

The hidden layers of the neural network may be fully-connected layers with varying size and any activation function, e.g. ReLU.

The output layer is a regression layer with a number of nodes equal to the number of components of the output matrix times two (since again, complex values are split into two real values). Similar as for the input matrix, the output matrix may have vectors (e.g. rows) for all chirps (since the neural network may also update the data for the chirps for which the second device receives FFT coefficients) or only vectors for the chirps for which the second device does not receive FFT coefficients and for which range FFT coefficients should be generated by the AI decompressing 604.

The neural network may for example have a structure as shown in FIG. 9.

In that case, for training, data D is simulated or recorded for a full pattern of chirps (eight chirps in this example like in the examples of FIG. 8). For the application to the present case, Di is the vector of range FFT Fourier coefficients of chirp i. Then, the extrapolation or interpolation factor is set and the data for some chirps (#2, #5, #6 in the example shown) is set to zero (i.e. range FFT result data for these chirps is zeroed).

The neural network 900 is then trained with
Input: data with zeroed range FFT output data and random channel errors
Ground truth output: original data (with or without channel errors so the neural network 900 may in addition be trained for error correction).

The neural network is thus trained to learn the relationship between zeroed range FFT result data and original range FFT result data.

For inference, for the present case and in the example illustrated in FIG. 9, the AI processing 604 input is range FFT output data 901 for five chirps (i.e. a matrix including a vector of range FFT coefficients for each of five chirps). In the AI processing, the received data is zero-padded to an input matrix 902 for the neural network 900.

The neural network is applied (run) on this input matrix 902 to produce an output matrix 903 (with range FFT output data for eight chirps, i.e. +60% increase in elements). The output matrix 903 is then supplied to the Doppler FFT.

It should be noted that in inference, the neural network (since it outputs the range FFT coefficients for the whole sequence of chirps) may modify (update) the existing measured values (i.e. those derived for chirps for which the first device provides FFT coefficients).

Alternatively, the neural network may only provide data for the missing chirps (i.e. for which the first device does not provide FFT coefficients). The network size can then be smaller (because of fewer input nodes and output nodes) but the existing data (for the chirps for which the first device has provided FFT coefficients) is not updated which may or may not be desirable.

The neural network for reconstructing range FFT coefficients may also have an autoencoder structure as illustrated in FIG. 10.

In that case, for training, data D is simulated or recorded using a full sequence of chirps (eight chirps in this example). Then, the extrapolation or interpolation factor is set and the data for some chirps (#2, #5, #6 in the example shown) is removed. The neural network 1000 is then trained with
Input: data for selected chirps (i.e. without those which have been removed)
Ground truth output: removed data.
The neural network is thus trained to learn the relationship between selected and removed data.

For inference, in this example for the present case, the AI processing input is data 1001 for five chirps (i.e. a matrix including a vector of range FFT coefficients for each of five chirps). This input data 1001 is also the input matrix for the neural network 1000.

The neural network is applied (run) on this input matrix 1001 to produce an output matrix 1002 having data for additional three chirps. The output matrix 1002 is put together with the input matrix 1001 to an input matrix 1003 for the Doppler FFT.

It should be noted that training may be performed by an external device. For example, the machine learning model may be trained by a computer and later be stored in a device implementing the AI processing. Nevertheless, the training device may be regarded as part of the radar system, even if it is external.

For case 3), i.e. restoration of Doppler FFT coefficients, a machine learning model is used to compute Doppler FFT coefficients which have been discarded.

In this example, it is for simplicity of explanation assumed that Doppler FFT coefficients for individual antennas (in general channels; i.e. Doppler FFT coefficients for that antenna for all range bins and Doppler bins) were discarded such that they can be reconstructed by interpolation and/or extrapolation over channels. These channels are in the following referred to as additional channels (with respect to the channels for which Doppler FFT coefficients have not been discarded). In case that certain Doppler FFT coefficients were discarded for all channels (for specific range bins and/or Doppler bins) the Doppler FFT coefficients may be analogously reconstructed via interpolation and/or extrapolation over range bins or Doppler bins (rather than channels). If not all Doppler FFT coefficients for individual channels have been discarded the Doppler FFT coefficients which have not been discarded do not need to be reconstructed but in the following, a way is described to reconstruct all (for a certain peak, i.e. the decompression is here assumed to be after peak detection but Doppler FFT coefficients may analogously be reconstructed for all range-Doppler bins). If any Doppler FFT coefficients do not need to be reconstructed, they can be fixed or the machine learning model may be configured to not provide an output for those.

So, in this example, before performing determining (estimating) DoA for the peaks in the aggregate R/D map, the input for the DoA (vectors of second FFT results for each identified peak) is processed by a neural network which generates a processed input which corresponds to an increased number of antenna elements (or channels) by extra- and interpolation.

FIG. 12 illustrates this extrapolation and interpolation for restoration of Doppler FFT coefficients for a virtual receive antenna array with eight antennas.

In a first diagram 1201, it is assumed that the first device only provides Doppler FFT coefficients for the third to sixth (virtual) antenna of the virtual receive antenna array (which form a uniform sub-array). The neural network generates second (i.e. Doppler) FFT result data (for the detected peaks) of the first, second, seventh and eight antenna by extrapolation of a uniform array.

In a second diagram 1202, it is assumed that the first device only provides Doppler FFT coefficients for the second, third, fifth and sixth (virtual) antenna of the virtual receive antenna array (which form a sparse array, i.e. an antenna array where not all positions (e.g. at most half of the positions) are occupied). The neural network generates second FFT result data (for the detected peaks) of the first and eight antenna by extrapolation of a sparse array.

In a third diagram 1203, it is assumed that the first device only provides Doppler FFT coefficients for the second, fifth, sixth and eighth (virtual) antenna of the virtual receive antenna array (which form a sparse array). The neural network generates second FFT result data (for the detected peaks) of the third, fourth and seventh antenna by interpolation of a sparse array.

In a fourth diagram 904, it is assumed that the first device only provides digitized receive samples for the second, fifth, sixth and eighth (virtual) antenna of the virtual receive antenna array (which form a sparse array). The neural network generates second FFT result data (for the detected peaks) of the first, third, fourth and seventh antenna by extrapolation and interpolation of a sparse array.

Training data for the neural network may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data to generate a corresponding DoA determination input vector. A second option is to simulate DoA determination input vectors directly for a scene.

For example, training data is generated by simulation runs with following parameters drawn from a random, uniform distribution:
Number of targets $x_0=[1 \ldots n]$
Angles of targets $x_1=[-90°, 90°]$
RCS (radar cross section) of the targets $x_2=[-5 \text{ dbsm}, 20 \text{ dbsm}]$
Channel phase error $x_3=[-10°, 10°]$
SNR of targets $x_4=[5 \text{ dB}, 20 \text{ dB}]$
In the input to the neural network, a complex-valued vector, e.g. $[c_0, c_1, c_2, c_3]$ in case of four channels ($c_i$ is the R/D map entry for channel i for a respective peak), may be reordered into a real-valued vector, e.g. [$r_0$, $r_1$, $r_2$, $r_3$, $i_0$, $i_1$, $i_2$, $i_3$] to keep the relationship between real and imaginary part.

The neural network may for example be (or include) an autoencoder or an MLP (multi-layer perceptron) or a recurrent neural network (RNN), e.g. with LSTM (long short-term memory)

The number of nodes of the input layer is equal to length of the input vector times two (complex values concatenated). The input vector may include, for each virtual channel (for which the first device provides data), the entry that the R/D map for that antenna has for the range-Doppler bin where that peak is located in the aggregate R/D map (so four complex, i.e. eight real values for the examples of FIG. 12). Alternatively, the input vector may have placeholders for the virtual channels for which the neural network is supposed to generate DoA determination input data (so, for example eight complex, i.e. 16 real values for the example of diagram 1204 since the virtual receive antenna array is supposed to be completely filled).

The hidden layers of the neural network may be fully-connected layers with varying size and any activation function, e.g. ReLU.

The output layer is a regression layer with a number of nodes equal to the output vector length times two (since again, complex values are split into two real values). Similar as for the input vector, the output vector may have components for all virtual receive antennas (since the neural network may also update the data for virtual receive antennas for which the first device provides data) or only components for the virtual receive antennas for which the first device does not provide input data and for which DoA determination input data should be generated by the AI decompressing 606.

The neural network may for example have a structure as shown in FIG. 9.

In that case, for training, data D is simulated or recorded using a full virtual receive antenna array (eight virtual channels in this example). Then, the extrapolation or interpolation factor is set and the data for some channels (2,5,6 in the example shown) is set to zero (i.e. channel data for these channels is zeroed). The neural network 900 is then trained with Input: data with zeroed channel data and random channel errors Ground truth output: original data (with or without channel errors so the neural network 900 may in addition be trained for error correction).

The neural network is thus trained to learn the relationship between zeroed channel data and original channel data.

For inference, for the present case and in the example illustrated in FIG. 9, the AI processing input is data 901 for five virtual channels (i.e. a DoA determination input vector with entries for five (virtual) receive antennas). In the AI processing, the received data is zero-padded to an input vector 902 for the neural network 900.

The neural network is applied (run) on this input vector 902 to produce an output vector 903 (size=8, i.e. +60% increase in elements). The output vector 903 is then supplied to the DoA determination (which uses an algorithm of choice (e.g. a third state FFT, or multiple signal classification (MUSIC)).

It should be noted that in inference, the neural network (since it outputs the DoA determination input data for the whole virtual channel array) may modify (update) the existing measured values (i.e. those derived for channels for which the first device provides samples).

Alternatively, the neural network may only provide data for the missing channels (i.e. for which the first device does not provide data). The network size can then be smaller (because of fewer input nodes and output nodes) but the existing data (for the channels for which the first device has provided samples) is not updated which may or may not be desirable.

The neural network for reconstructing range FFT coefficients may also have an autoencoder structure as illustrated in FIG. 10.

In that case, for training, data D is simulated or recorded using a full virtual receive antenna array (eight virtual channels in this example). Then, the extrapolation or interpolation factor is set and the data for some channels (2,5,6 in the example shown) is removed. The neural network 1000 is then trained with Input: data for selected channels (i.e. without those which have been removed)

Ground truth output: removed data.

The neural network is thus trained to learn the relationship between selected and removed data.

For inference, in this example for the present case, the AI processing input is data 1001 for five virtual channels (i.e. a DoA determination input vector with entries for five (virtual) receive antennas). This input data 1001 is also the input vector for the neural network 1000.

The neural network is applied (run) on this input vector 1001 to produce an output vector 1002 having data for additional three channels. The output vector 1002 is put together with the input vector 1001 to an input vector 1003 for the DoA determination (which uses an algorithm of choice (e.g. a third stage FFT, or multiple signal classification (MUSIC)).

It should be noted that training may be performed by an external device. For example, the machine learning model may be trained by a computer and later be stored in a device implementing the AI processing. Nevertheless, the training device may be regarded as part of the radar system, even if it is external.

It should further be noted that the neural network may also be configured to reconstruct whole layers of the cube of radar data at once (i.e. its output layer gives values for (at least) the discarded values of a whole layer of the cube of radar data, for example it reconstructs discarded Doppler FFT values of a whole R/D map).

Additionally, it should be noted that the first device may only omit parts of the radar data from the transmission (not necessarily discard it). So, the data which is referred to discarded data herein may also be seen as data to be omitted from the transmission from the first device to the second device.

Figure 13:
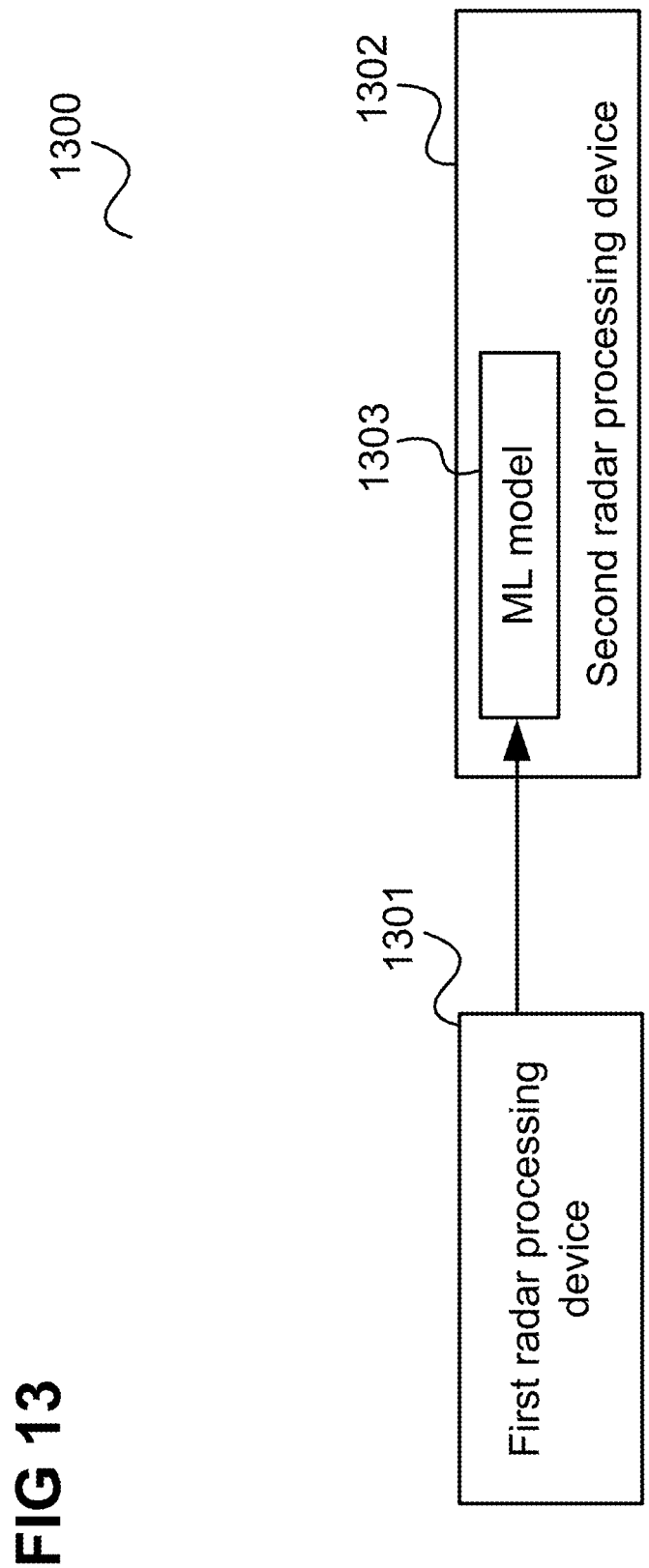
FIG. 13 shows a radar system according to an embodiment.

In summary, according to various embodiments, a radar system is provided as illustrated in FIG. 13.

FIG. 13 shows a radar system 1300 according to an embodiment.

The radar system 1300 includes a first radar processing device 1301 and a second radar processing device 1302.

The first radar processing device 1301 is configured to generate radar data and to transmit the radar data partially to the second radar processing device 1302 for further processing, wherein the first radar processing device is configured to omit parts of the radar data from the transmission.

The second radar processing device 1302 is configured to reconstruct the omitted parts using a machine learning model 1303 trained to supplement radar data with additional radar data and is configured to further process the transmitted parts of the radar data in combination with the additional radar data.

According to various examples, in other words, radar data are compressed by discarding parts of it and, after transmitting the compressed radar data, the discarded parts are reconstructed on the receiver side using a machine learning model trained for that purpose.

For example, the first radar processing device is a radar sensor device including an MMIC and integrated processing which performs sampling and range FFT and the second radar processing device is a device of an ADAS which performs the further radar processing (i.e. here the processing after range FFT, i.e. Doppler FFT etc.).

Alternatively, for example, the first radar processing performs range FFT and Doppler FFT (e.g. is a microcontroller performing the FFTs) and the second radar processing device is a device of an ADAS and performs the further radar processing (i.e. DoA determination etc.). The first radar processing device may receive the samples from a further radar processing device, e.g. an MMIC. The microcontroller and the MMIC may for example be part of a radar sensor.

According to various examples a method as illustrated in FIG. 14 is performed.

FIG. 14 shows a flow diagram 1400 illustrating a method for transmitting data in a radar system.

In 1401, a first radar processing device generates radar data.

In 1402, the radar data is transmitted partially from the first radar processing device to a second radar processing device for further processing, wherein the first radar processing device omits parts of the radar data from the transmission.

In 1403, the second radar processing device reconstructs the omitted parts using a machine learning model trained to supplement radar data with additional radar data.

In 1404, the second radar processing device further processes the transmitted parts of the radar data in combination with the additional radar data.

The method may be performed and the components of the radar system may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor". In particular, the first radar processing device and the second radar processing device may each include one or more circuits. For example, one of them may correspond to the radar signal processing circuit 111. The first radar processing device may be an MMIC. They may be electronic device connected by one or more communication lines such as a bus.

The following examples pertain to further exemplary implementations.

Example 1 is a radar system as illustrated in FIG. 13.

Example 2 is the radar system of Example 1, wherein the radar data are radar samples, the first radar processing device is configured to omit radar samples for certain sampling times and the second radar processing device is configured to reconstruct the omitted radar samples and to perform a range Fourier transformation using the reconstructed radar samples.

Example 3 is the radar system of Example 2, wherein the first radar processing device is configured to omit radar samples for certain combinations of sampling time, radar channel and chirp.

Example 4 is the radar system of Example 2 or 3, wherein the second radar processing device is configured to reconstruct the omitted radar samples by extrapolating and/or interpolating transmitted radar samples for other sampling times, radar channels and/or chirps transmitted from the first radar processing device to the second radar processing device.

Example 5 is the radar system of Example 1, wherein the radar data are range Fourier transform results, the first radar processing device is configured to omit range Fourier transform results for certain chirps and the second radar processing device is configured to reconstruct the omitted range Fourier transform results to perform a Doppler Fourier transformation using the reconstructed range Fourier transform results.

Example 6 is the radar system of Example 5, wherein the first radar processing device is configured to omit range Fourier transform results for certain combinations of range bin, radar channel and chirp.

Example 7 is the radar system of Example 5 or 6, wherein the second radar processing device is configured to reconstruct the omitted range Fourier transform results by extrapolating and/or interpolating range Fourier transform results for other range bins, radar channels and/or chirps from the first radar processing device to the second radar processing device.

Example 8 is the radar system of Example 1, wherein the radar data are Doppler Fourier transform results, the first radar processing device is configured to omit Doppler Fourier transform results for certain radar channels and the second radar processing device is configured to reconstruct the omitted Doppler Fourier transform results to perform direction of arrival determination using the reconstructed Doppler Fourier transform results.

Example 9 is the radar system of Example 8, wherein the first radar processing device is configured to omit Doppler Fourier transform results for certain combinations of range bin, radar channel and Doppler bin.

Example 10 is the radar system of Example 8 or 9, wherein the second radar processing device is configured to reconstruct the omitted Doppler Fourier transform results by extrapolating and/or interpolating Doppler Fourier transform results for other range bins, radar channels and/or Doppler bins from the first radar processing device to the second radar processing device.

Example 11 is the radar system of any one of Examples 1 to 10, wherein the first radar processing device is configured to discard the parts of the radar data.

Example 12 is the radar system of any one of Examples 1 to 10, wherein the first radar processing device is configured the parts of the radar according to a mask and is configured to signal the mask to the second radar processing device.

Example 13 is the radar system of Example 12, wherein the first radar processing device is configured to determine a compression rate and determine the mask according to the determined compression rate.

Example 14 is the radar system of any one of Examples 1 to 13, wherein the first radar processing device is a Monolithic Microwave Integrated Circuit and the second radar processing device is a microcontroller.

Example 15 is the radar system of any one of Examples 1 to 14, wherein the first radar processing device is a radar sensor device of a vehicle and wherein the second radar processing device is a processing device of an Advanced Driver Assistance System of the vehicle.

Example 16 is the radar system of any one of Examples 1 to 15, including a training device configured to train the machine learning model.

Example 17 is the radar system of any one of Examples 1 to 16, wherein the machine learning model is a neural network.

Example 18 is the radar system of any one of Examples 1 to 17, wherein the machine learning model includes at least one of a multi-layer perceptron, an autoencoder and a UNet.

Example 19 is a method for transmitting data in a radar system as illustrated in FIG. 14.

Example 20 is the method of Example 19, further including training the machine learning model.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

REFERENCE SIGNS 100 radar arrangement
101 radar device
102 antenna arrangement
103 radar control device
104 transmitter
105 duplexer
106 receiver
107 controller
108 object
109 transmit signal
110 echo
111 radar signal processing circuit
200 FMCW radar system
201 saw tooth waveform
202 oscillator
203 transmit antenna
204 receive antenna
205 mixer
206 low pass filter
207 spectrum analyzer
208 chirp
300 radar device
301 oscillator with ramper
302 transmit amplifiers
303 mixers
304 analog filters
305 ADCs
306 digital interface
307 radar signal processor
308 radar signal processing circuit
309 output interface
310 MMIC
311 power amplifier
312 transmit signal interface
401 MMIC
402 radar signal processing chain
403-411 radar processing
500 data cube
501 aggregate range/Doppler map
502 FFT peaks
503 receive antennas
601, 603, 605 compression
602, 604, 606 decompression
701, 702 full cube of radar data
703, 704 compressed cube of radar data
801 diagram
802-806 samples
807 range FFT input data
808-810 samples
811 diagram
812-815 samples
816 range FFT input data
817-820 samples
900 neural network
901 input data
902 input vector
903 output vector
1000 neural network
1001 input data
1002 neural network output vector
1003 range FFT/Doppler FFT/DoA input vector/matrix
1101 diagram
1102-1105 range FFT coefficient vectors
1106 Doppler FFT input data
1107-1110 range FFT coefficient vectors
1111 diagram
1112-1116 range FFT coefficient vectors
1117 Doppler FFT input data
118-1120 range FFT coefficient vectors
1201-1204 diagrams
1300 radar system
1301 first radar processing device
1302 second radar processing device
1303 ML model
1400 flow diagram
1401-1404 processing operations

What is claimed is:

1. A radar system, comprising:
a first radar processing device and a second radar processing device,
wherein the first radar processing device is configured to generate radar data and to transmit the radar data partially to the second radar processing device for further processing, wherein the first radar processing device is configured to omit, according to a mask, parts of the radar data from the transmission, wherein the first radar processing device is configured to signal the mask to the second radar processing device; and
wherein the second radar processing device is configured to reconstruct the omitted parts using a machine learning model trained to supplement radar data with additional radar data and is configured to further process the transmitted parts of the radar data in combination with the additional radar data, wherein the machine learning model has been trained with training data that comprises data samples for a sequence of sampling times, wherein the data samples have been set to zero for at least a portion of the sampling times in the sequence.

2. The radar system of claim 1, wherein the radar data are radar samples, the first radar processing device is configured to omit radar samples for certain sampling times and the second radar processing device is configured to reconstruct the omitted radar samples and to perform a range Fourier transformation using the reconstructed radar samples.

3. The radar system of claim 2, wherein the first radar processing device is configured to omit radar samples for certain combinations of sampling time, radar channel and chirp.

4. The radar system of claim 2, wherein the second radar processing device is configured to reconstruct the omitted radar samples by extrapolating and/or interpolating transmitted radar samples for other sampling times, radar channels and/or chirps transmitted from the first radar processing device to the second radar processing device.

5. The radar system of claim 1, wherein the radar data are range Fourier transform results, the first radar processing device is configured to omit range Fourier transform results for certain chirps and the second radar processing device is configured to reconstruct the omitted range Fourier transform results to perform a Doppler Fourier transformation using the reconstructed range Fourier transform results.

6. The radar system of claim 5, wherein the first radar processing device is configured to omit range Fourier transform results for certain combinations of range bin, radar channel and chirp.

7. The radar system of claim 5, wherein the second radar processing device is configured to reconstruct the omitted range Fourier transform results by extrapolating and/or interpolating range Fourier transform results for other range bins, radar channels and/or chirps from the first radar processing device to the second radar processing device.

8. The radar system of claim 1, wherein the radar data are Doppler Fourier transform results, the first radar processing device is configured to omit Doppler Fourier transform results for certain radar channels and the second radar processing device is configured to reconstruct the omitted Doppler Fourier transform results to perform direction of arrival determination using the reconstructed Doppler Fourier transform results.

9. The radar system of claim 8, wherein the first radar processing device is configured to omit Doppler Fourier transform results for certain combinations of range bin, radar channel and Doppler bin.

10. The radar system of claim 9, wherein the second radar processing device is configured to reconstruct the omitted Doppler Fourier transform results by extrapolating and/or interpolating Doppler Fourier transform results for other range bins, radar channels and/or Doppler bins that are different from the certain combinations of range bin, radar channel and Doppler bin used to omit Doppler Fourier transform results.

11. The radar system of claim 1, wherein the first radar processing device is configured to discard the parts of the radar data.

12. The radar system of claim 1, wherein the first radar processing device is configured to determine a compression rate and determine the mask according to the determined compression rate.

13. The radar system of claim 1, wherein the first radar processing device is a Monolithic Microwave Integrated Circuit and the second radar processing device is a microcontroller.

14. The radar system of claim 1, wherein the first radar processing device is a radar sensor device of a vehicle and wherein the second radar processing device is a processing device of an Advanced Driver Assistance System of the vehicle.

15. The radar system of claim 1, comprising a training device configured to train the machine learning model with the training data.

16. The radar system of claim 1, wherein the machine learning model is a neural network.

17. The radar system of claim 1, wherein the machine learning model comprises at least one of a multi-layer perceptron, an autoencoder and a UNet.

18. A method for transmitting data in a radar system, the method comprising:
generating radar data by a first radar processing device;
transmitting the radar data partially from the first radar processing device to a second radar processing device for further processing, wherein the first radar processing device omits, according to a mask, parts of the radar data from the transmission and signals the mask to the second radar processing device;
reconstructing the omitted parts, by the second radar processing device, using a machine learning model trained to supplement radar data with additional radar data, wherein the machine learning model has been trained with training data that comprises data samples for a sequence of sampling times, wherein the data samples have been set to zero for at least a portion of the sampling times in the sequence; and
further processing the transmitted parts of the radar data in combination with the additional radar data by the second radar processing device.

19. The method of claim 18, further comprising training the machine learning model.

* * * * *